(12) United States Patent
Ishida et al.

(10) Patent No.: US 11,066,187 B2
(45) Date of Patent: Jul. 20, 2021

(54) TRANSPORT JIG

(71) Applicant: MITSUBISHI HEAVY INDUSTRIES, LTD., Tokyo (JP)

(72) Inventors: Makoto Ishida, Tokyo (JP); Yuji Ito, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 16/467,714

(22) PCT Filed: Oct. 25, 2017

(86) PCT No.: PCT/JP2017/038585
§ 371 (c)(1),
(2) Date: Jun. 7, 2019

(87) PCT Pub. No.: WO2018/110102
PCT Pub. Date: Jun. 21, 2018

(65) Prior Publication Data
US 2020/0010217 A1    Jan. 9, 2020

(30) Foreign Application Priority Data

Dec. 13, 2016   (JP) .............................. JP2016-241048

(51) Int. Cl.
*B64F 5/10*       (2017.01)
*A47B 81/00*    (2006.01)
(Continued)

(52) U.S. Cl.
CPC .............. *B64F 5/10* (2017.01); *A47B 81/005* (2013.01); *B62B 3/02* (2013.01); *B62B 3/102* (2013.01); *B62B 2206/003* (2013.01)

(58) Field of Classification Search
CPC . B64F 5/10; A47B 81/005; B62B 3/02; B62B 3/102
See application file for complete search history.

(56) References Cited

U.S. PATENT DOCUMENTS 3,147,860 A * 9/1964 Kean, Sr. ............... B65D 85/48
                                                                206/448
3,499,398 A * 3/1970 Murray ................ B65D 19/385
                                                                108/53.5
(Continued)

FOREIGN PATENT DOCUMENTS

JP    S57-149220 U    9/1982
JP    H08-169343 A    7/1996
(Continued)

OTHER PUBLICATIONS

International Search Report issued in corresponding International Patent Application No. PCT/JP2017/038585, dated Jan. 16, 2018 (3 pages).

(Continued)

*Primary Examiner* — Stanton L Krycinski
(74) *Attorney, Agent, or Firm* — Osha Bergman Watanabe & Burton LLP (57) ABSTRACT

A transport jig includes: a frame member; and a support section that is installed on the frame member and that supports a plurality of elongated members. The elongated members are each entirely housed inside the frame member in a lengthwise direction and the support section supports the plurality of elongated members in parallel with one another in one direction.

7 Claims, 6 Drawing Sheets

(51) Int. Cl.
*B62B 3/02* (2006.01)
*B62B 3/10* (2006.01)

(56) References Cited

U.S. PATENT DOCUMENTS

| | | | | | |
|---|---|---|---|---|---|
| 3,557,855 | A | * | 1/1971 | Weingarten | B65D 19/06 |
| | | | | | 206/386 |
| 3,809,234 | A | * | 5/1974 | Kurick | B65D 85/48 |
| | | | | | 206/448 |
| 4,733,781 | A | * | 3/1988 | Gerlach | B65D 19/44 |
| | | | | | 206/448 |
| 4,919,277 | A | * | 4/1990 | Jeruzal | B65D 19/44 |
| | | | | | 206/454 |
| 5,037,256 | A | * | 8/1991 | Schroeder | B61D 45/006 |
| | | | | | 403/325 |
| 5,141,114 | A | * | 8/1992 | Cate, Jr. | B65D 19/44 |
| | | | | | 206/448 |
| 5,217,121 | A | * | 6/1993 | Walker | B65G 1/14 |
| | | | | | 211/41.1 |
| 5,378,093 | A | * | 1/1995 | Schroeder | B61D 45/006 |
| | | | | | 211/41.15 |
| 5,507,091 | A | * | 4/1996 | Bullen | B23P 21/004 |
| | | | | | 269/290 |
| 5,582,495 | A | * | 12/1996 | Schroeder | B60P 7/10 |
| | | | | | 211/41.15 |
| 5,641,076 | A | * | 6/1997 | Englund | B65D 85/48 |
| | | | | | 206/454 |
| 5,720,228 | A | * | 2/1998 | Clive-Smith | B65D 19/12 |
| | | | | | 108/55.1 |
| 5,810,186 | A | * | 9/1998 | Lam | B65D 88/129 |
| | | | | | 108/55.1 |
| 5,876,165 | A | * | 3/1999 | Campbell | B60P 7/10 |
| | | | | | 211/183 |
| 5,950,836 | A | * | 9/1999 | Iwamoto | B65D 81/113 |
| | | | | | 206/386 |
| 6,146,068 | A | * | 11/2000 | Schroeder | B60P 7/12 |
| | | | | | 410/143 |
| 6,588,605 | B1 | * | 7/2003 | Volkert | B65D 88/005 |
| | | | | | 206/449 |
| 6,742,663 | B2 | * | 6/2004 | Chubb | B65D 19/12 |
| | | | | | 211/41.14 |
| 7,014,402 | B2 | * | 3/2006 | Kessler | B65D 19/44 |
| | | | | | 410/155 |
| 7,128,509 | B2 | * | 10/2006 | Farley | B65D 19/44 |
| | | | | | 410/43 |
| 7,237,993 | B2 | * | 7/2007 | Farley | B65D 19/44 |
| | | | | | 410/43 |
| 7,293,946 | B1 | * | 11/2007 | Fuller | B60P 7/13 |
| | | | | | 410/143 |
| 7,802,526 | B2 | * | 9/2010 | Brady | B65D 19/12 |
| | | | | | 108/53.5 |
| 2004/0131441 | A1 | * | 7/2004 | Kessler | B65D 19/44 |
| | | | | | 410/155 |
| 2007/0189884 | A1 | | 8/2007 | Masters et al. | |
| 2012/0110816 | A1 | * | 5/2012 | Groves | B62B 3/10 |
| | | | | | 29/428 |

FOREIGN PATENT DOCUMENTS

| | | |
|---|---|---|
| JP | H11-106104 A | 4/1999 |
| JP | 2009-527401 A | 7/2009 |
| JP | 2012-218780 A | 11/2012 |

OTHER PUBLICATIONS

Written Opinion issued in corresponding International Patent Application No. PCT/JP2017/038585, dated Jan. 16, 2018 (9 pages).

* cited by examiner

TRANSPORT JIG

TECHNICAL FIELD

The present invention relates to a transport jig, and more particularly, to a transport jig for housing elongated members for forming an aircraft part.

BACKGROUND ART

Aircraft parts such as a fuselage and primary wings are formed of a plurality of members including skins, which are plate-shaped members, and frames and stringers, which are elongated members. In the case where the aircraft part is the fuselage, the skin has a shape which is an arc in a cross section perpendicular to a body axis direction of the aircraft. The frame is an elongated member disposed along a circumference of the skin, is arc-shaped, and has a curvature. The stringer is a member disposed on the skin, in parallel with the body axis direction of the aircraft, and is a substantially straight elongated member. An aircraft part such as a fuselage is manufactured by attaching the frame or the stringer to the skin. The fuselage of an aircraft is circular in cross section, and a diameter of the circular shape changes along the body axis direction, and thus, the skins, the frames, and the stringers include various types, and are three-dimensionally shaped. Moreover, members such as the skin, the frame, and the stringer are reduced in weight, and has low rigidity.

Patent Literature 1 below discloses an invention related to a transport tool for transporting a body section of a large composite aircraft, and discloses a technique of supporting, positioning, and transporting the body section by the transport tool.

CITATION LIST

Patent Literature

[PTL 1]
Japanese Translation of PCT International Application, Publication No. 2009-527401

SUMMARY OF INVENTION

Technical Problem

As described above, each member for forming an aircraft part such as a fuselage has characteristics that it has an elongated shape, has low rigidity, includes various types, and has a three-dimensional shape. Accordingly, each member is difficult to handle, and it is difficult to transport each member to an assembly place or the like. If a transport work may be efficiently performed for each member, an unmanned rate of a factory may be increased, but the characteristics of each member described above, or in other words, the elongated shape, the low rigidity, the variety in types, and the three-dimensional shape, have to be first overcome.

The present invention has been made in view of such circumstances, and has its object to provide a transport jig which enables a plurality of elongated members to be easily transported, and which enables access to the plurality of elongated members from one direction.

Solution to Problem

A transport jig according to an aspect of the present invention includes a frame member, and a support section that is installed on the frame member, and that supports a plurality of elongated members, wherein the elongated members are each entirely housed inside the frame member in a lengthwise direction, and the support section supports the plurality of elongated members in parallel with one another in one direction.

According to such a configuration, the support section is installed on the frame member, and supports a plurality of elongated members. Because the plurality of elongated members is housed inside the frame member, the frame member is an outermost peripheral part of the transport jig. Furthermore, the plurality of elongated members is supported in parallel with one another in one direction by the support section, and the plurality of elongated members may be accessed from outside the frame member, from the one direction. Accordingly, an access direction does not have to be changed for each elongated member at the time of applying a sealant on, or machining, same surfaces of the elongated members, and work efficiency is high. Moreover, the elongated members housed inside the frame member may be easily removed to outside the frame member.

In the aspect described above, the support section may be formed according to a shape of the elongated members to be housed, and is attachable/detachable with respect to the frame member.

According to such a configuration, because the support section is formed according to the shape of the elongated members, and is attachable/detachable with respect to the frame member, a plurality of types of elongated members of different shapes may be housed in the frame member by replacing the support section.

In the aspect described above, the frame member may be placed in a state where the frame member is installed in a first direction allowing surfaces of the elongated members on which a sealant is to be applied or on which machining is to be performed to face upward, and a state where the frame member is installed in a second direction different from the first direction, the second direction allowing the elongated members housed in the frame member to be removed to outside the frame member.

According to such a configuration, when the frame member is along the first direction, the surfaces of the elongated members on which a sealant is to be applied or on which machining is to be performed may be caused to face upward, and when the frame member is along the second direction, the elongated members housed in the frame member may be removed to outside the frame member.

In the aspect described above, a jack provided at the frame member may be driven to change between the first direction and the second direction.

According to such a configuration, an orientation of the frame member may be changed between the first direction and the second direction by driving the jack.

In the aspect described above, the transport jig may further include a wheel that is installed on the frame member.

According to such a configuration, the transport jig may be moved by the wheel installed on the frame member.

Advantageous Effects of Invention

According to the present invention, a plurality of elongated members may be easily transported, and the plurality of elongated members may be accessed from one direction.

DESCRIPTION OF EMBODIMENTS

Hereinafter, embodiments of the present invention will be described with reference to the drawings.

First Embodiment

Hereinafter, a transport jig 1 according to a first embodiment of the present invention will be described with reference to FIGS. 1 and 2.

The transport jig 1 according to the present embodiment is capable of housing, on an inside, a plurality of elongated members for forming an aircraft part, and of collectively transporting the plurality of elongated members. In the present embodiment, the elongated member is an arc-shaped frame which forms an aircraft part (fuselage, primary wing, etc.), for example. In the following, a case where the transport jig 1 houses a frame 51 will be described.

The transport jig 1 includes a frame member 3, and a support section 4 installed on the frame member 3.

For example, the frame member 3 has a cuboid shape, and bar-shaped members forming the frame member 3 are disposed at parts corresponding to sides of the cuboid. The frame member 3 is formed by combining a plurality of bar-shaped members. For example, the bar-shaped members of the frame member 3 include four first members 7 forming a quadrangle, four second members 8 that are perpendicularly installed on the first members 7 and that are parallel to one another, two third members 9 that are perpendicularly installed on the second members 8 and that are parallel to each other, and diagonal members 10 that are diagonally disposed, each diagonal member 10 joining the second member 8 and the third member 9. End portions of the first member 7 and the second member 8 are connected to each other, and end portions of the second member 8 and the third member 9 are connected to each other.

The frame 51 is entirely housed inside the frame member 3 in a lengthwise direction. That is, the frame member 3 is formed such that, when a plurality of frames 51 are housed inside the transport jig 1, the frame member 3 is made an outermost peripheral part of the transport jig 1. Therefore, even when a plurality of transport jigs 1 are arranged next to one another in a horizontal direction or are stacked one above the other in a vertical direction in a factory or the like, the transport jigs 1 may be disposed adjacent to one another without being interfered with by contents such as the frames 51. Accordingly, the transport jigs 1 and contents such as the frames 51 may be stored in a predetermined place in an orderly manner.

The support section 4 is installed on the frame member 3, inside the frame member 3. That is, the support section 4 is housed inside the frame member 3, with the frame member 3 being at the outermost peripheral part of the transport jig 1. The support section 4 supports a plurality of frames 51 in parallel with one another in one direction.

For example, the support section 4 includes a first base section 11 that is connected at both end portions to the first member 7, a second base section 12 having an arc shape along the shape of the frame 51, and a clamp (not shown) that is installed on the first base section 11 and that holds the frame 51.

For example, the first base section 11 is installed near an end portion of the frame member 3 in a longitudinal direction, and a plurality of second base sections 12 are installed in parallel with one another between two first base sections 11. One frame 51 may be installed on one second base section 12, and the number of second base sections 12 to be installed is determined based on the number of frames 51 to be housed in the transport jig 1.

A shape of the support section 4, or in other words, shapes of the first base section 11 and the second base section 12 or a shape combining the base sections, is according to a shape of the frame 51 to be housed, and is a shape that can be attached/detached to/from the frame member 3. Accordingly, a plurality of types of frames 51 of different shapes may be housed in the frame member 3 by replacing the support section 4.

The clamp is fixed to the first base section 11 or the second base section 12, and holds one frame 51. The clamp is disposed at a position corresponding to an end portion or a mid-portion of the frame 51 that is placed on the second base section 12. The number of clamps to be installed on the first base sections 11 and the second base section 12 to hold one frame 51 is determined according to a length, a shape and the like of the frame 51.

Figure 1:
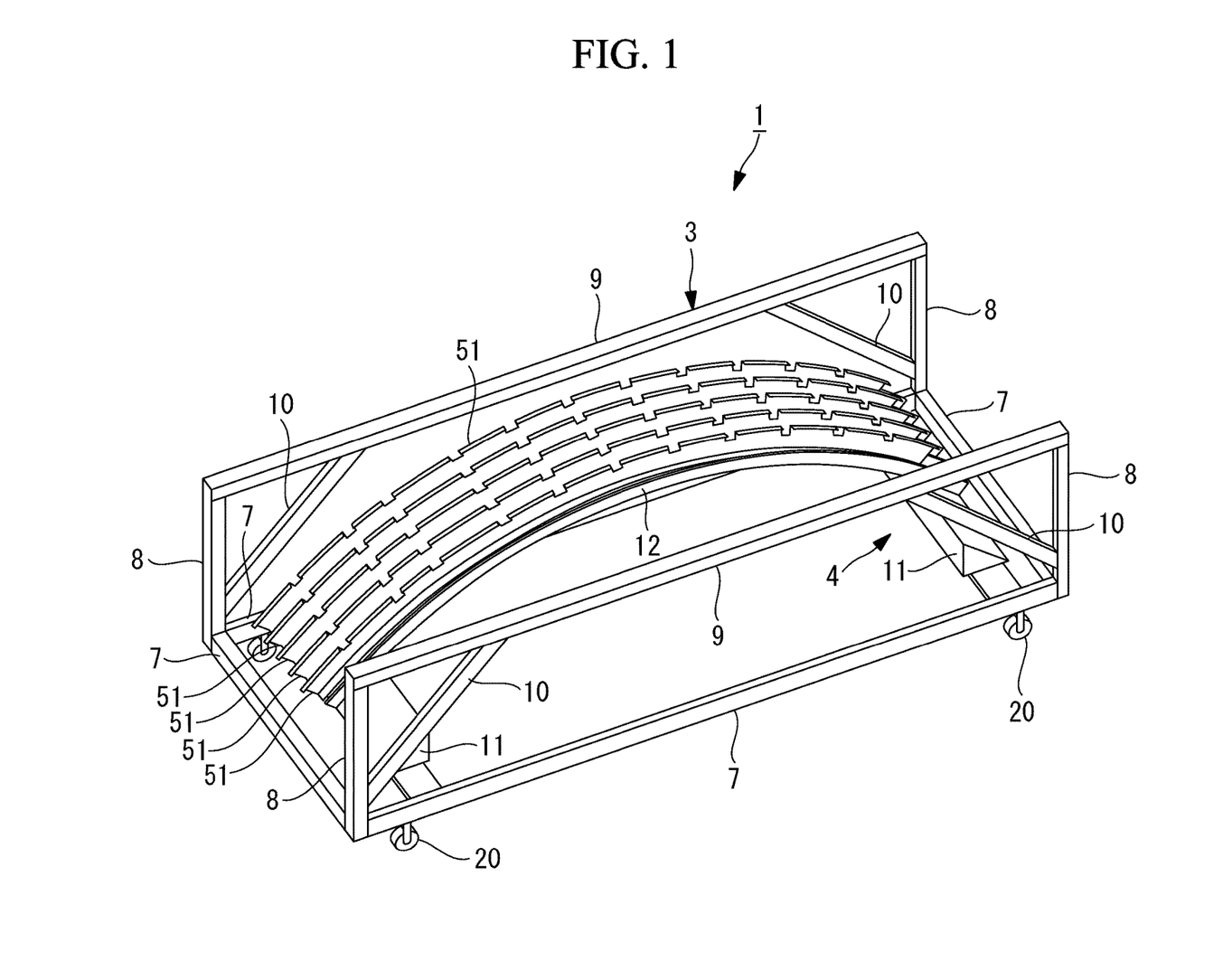
FIG. 1 is a perspective view showing a transport jig according to a first embodiment of the present invention, and shows a state where the transport jig is installed in a first direction.
Figure 2:
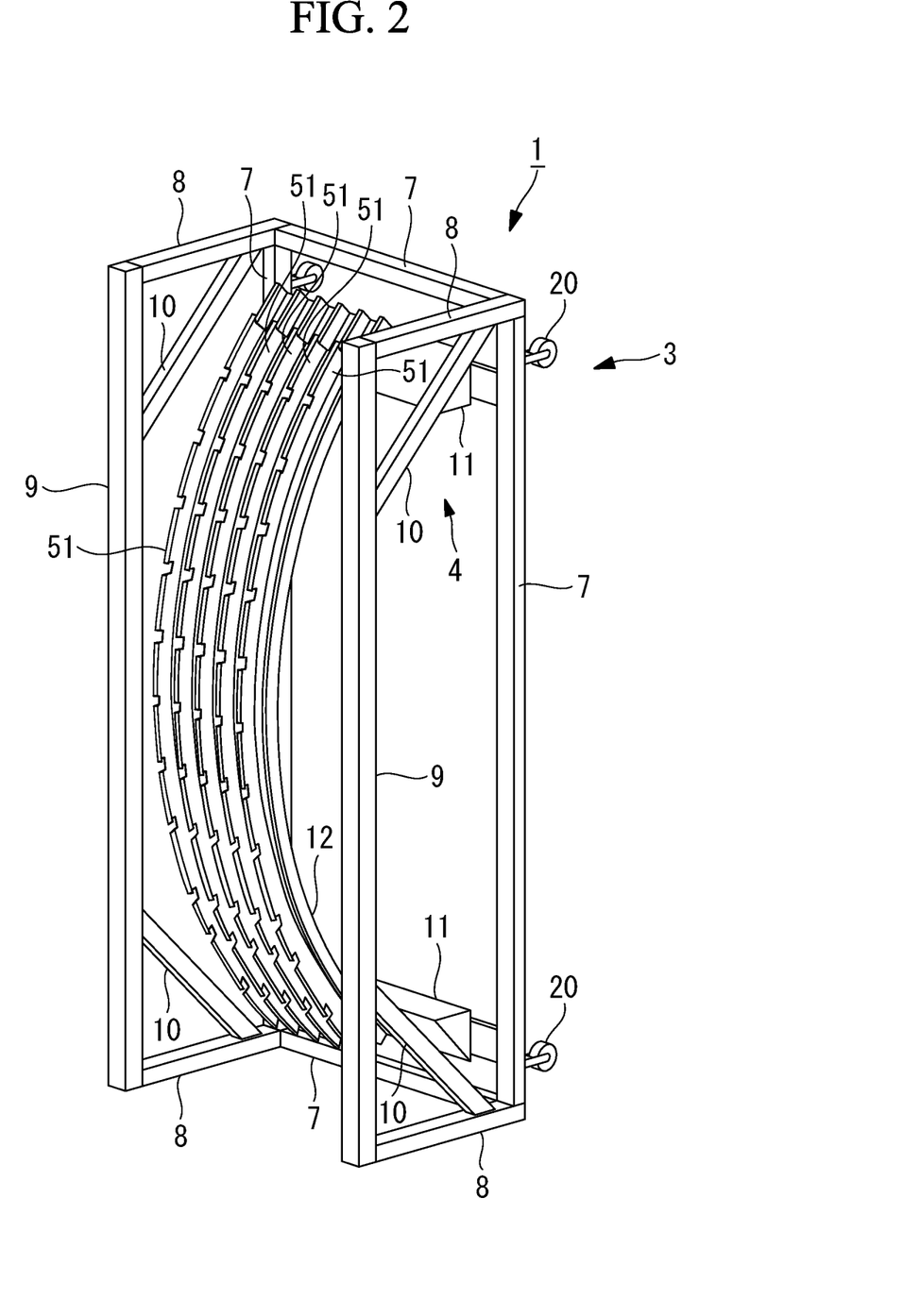
FIG. 2 is a perspective view showing the transport jig according to the first embodiment of the present invention, and shows a state where the transport jig is installed in a second direction.

The transport jig 1 is formed in such a way that a sealant may be easily applied to the frame 51 that is housed, as shown in FIG. 1, and in such a way that the frame 51 may be easily removed from inside to outside the transport jig 1, as shown in FIG. 2, by changing an installation direction of the transport jig 1. Additionally, a case of applying a sealant to the frame 51 is described below, but the present invention is not limited to such an example, and machining such as drilling may be performed on the elongated member such as the frame 51 that is housed in the transport jig 1.

Furthermore, as shown in FIGS. 1 and 2, wheels 20 are installed on the frame member 3 of the transport jig 1, and the transport jig 1 may be moved by the wheels 20 when the transport jig 1 is installed in a first direction described later. The transport jig 1 is thus moved from a storage place to a work place, or between different work places, for example. Additionally, the transport jig 1 may be placed on a wheeled platform (not shown) and be moved by the wheeled platform, for example, without being limited to a case where the wheels 20 are installed on the frame member 3 in advance.

<First Direction>

As shown in FIG. 1, when the transport jig 1 is installed in a first direction, or in other words, when the transport jig 1 is installed with a quadrangular plane formed by the first members 7 of the frame member 3 at a bottom, the arc-shaped second base section 12 is disposed protruding upward. In the case where the frame 51 is disposed along the second base section 12 in a state where the transport jig 1 is installed in the first direction, an outer peripheral surface of the frame 51 is positioned on an upper surface side of the transport jig 1.

The sealant is applied to the outer peripheral surface of the frame 51 facing a skin, before a process of installing the frame 51 on the skin. The skin and the frame 51 adhere to each other by the sealant by application of the sealant to the frame 51. In the case of installation in the first direction, the outer peripheral surface of the frame 51, or in other words, an application surface, faces upward, and also, a plurality of frames 51 are disposed inside the frame member 3, in parallel with one another in one direction. Accordingly, a worker or a work robot may access the plurality of frames 51 from the one direction, from outside the frame member 3. Accordingly, when the sealant is applied to same surfaces of the frames 51, an access direction does not have to be changed for each frame 51, and work efficiency is high.

<Second Direction>

As shown in FIG. 2, when the transport jig 1 is installed in a second direction, or in other words, when the transport jig 1 is installed with a plane, of the frame member 3, formed by two second members 8 and one first member 7 at a bottom, the arc-shaped second base section 12 is disposed protruding in a direction parallel to the horizontal direction, or in other words, the second base section 12 is disposed with an arc connecting both end portions of the second base section 12 extending along the vertical direction. In the case where the transport jig 1 is disposed in the second direction, and the frame 51 is disposed along the second base section 12, the outer peripheral surface of the frame 51 is positioned on a side surface side of the transport jig 1.

In the process of installing the frame 51 on the skin, the frame 51 is desirably transported with an arc connecting both end portions extending along the vertical direction. When the transport jig 1 is installed in the second direction, the arc connecting both end portions of the frame 51 extends in the vertical direction in the frame member 3, and a plurality of frames 51 are disposed in parallel with one another in the one direction. Accordingly, at the time of removing the frame 51 from the transport jig 1 and transporting the frame 51 to a place at which the frame 51 is to be installed on the skin, the worker or the work robot may transport the frame 51 while hardly changing an orientation of the frame 51.

Figure 3:
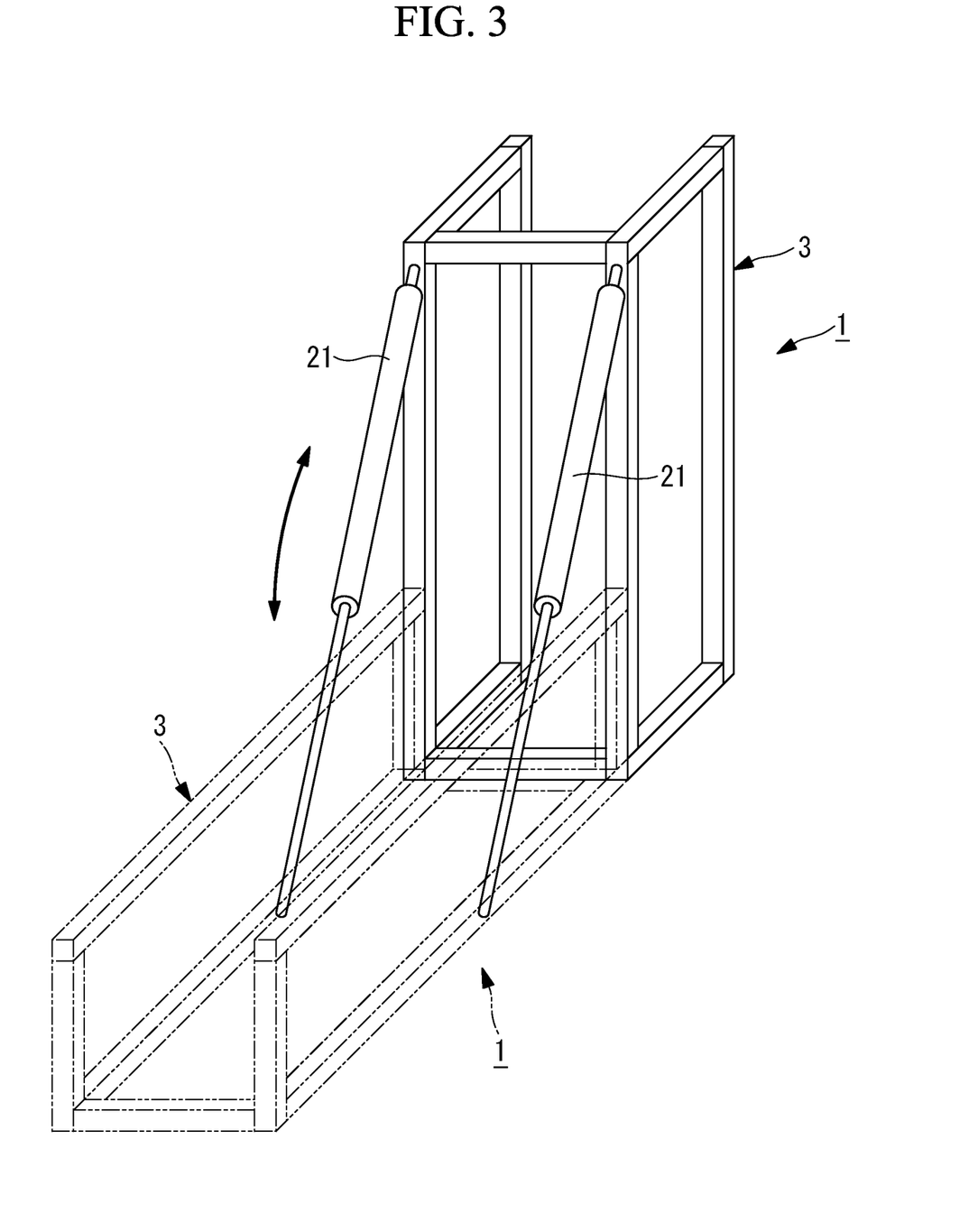
FIG. 3 is a perspective view showing the transport jig according to the first embodiment of the present invention, and solid line parts show a state where the transport jig is installed in the second direction, and dashed-double dotted line parts show a state where the transport jig is installed in the first direction.

The transport jig 1 is changed between the first direction and the second direction by a lifting device such as a chain block. Additionally, for example, as shown in FIG. 3, jacks 21 may be installed on the frame member 3 of the transport jig 1, and the transport jig 1 may be changed between the first direction and the second direction by driving the jacks 21. In FIG. 3, the transport jig 1 shown by solid lines is installed in the second direction, and the transport jig 1 shown by dashed-double dotted lines is installed in the first direction. Additionally, the support section 4 and the frames 51 are omitted in FIG. 3. The transport jig 1 may be formed such that the jacks 21 are attached to the frame member 3 when the direction is to be changed, or may be formed such that the jacks 21 are permanently installed on the frame member 3, even when the direction is not to be changed.

Second Embodiment

Next, a transport jig 2 according to a second embodiment of the present invention will be described with reference to FIGS. 4 and 5.

The transport jig 2 is capable of housing, on an inside, a plurality of elongated members, and of collectively transporting the plurality of elongated members. In the present embodiment, the elongated member is a substantially straight stringer which forms an aircraft part (fuselage, primary wing, etc.), for example. In the following, a case where the transport jig 2 houses a stringer 52 will be described.

The transport jig 2 includes a frame member 5, and a support section 6 installed on the frame member 5.

For example, the frame member 5 has a quadrangular shape, and bar-shaped members forming the frame member 5 are disposed at parts corresponding to sides of the quadrangle. The frame member 5 is formed by combining a plurality of bar-shaped members. For example, the bar-shaped members of the frame member 5 include one first member 13 forming a long side of the quadrangle, and three second members 14 that are perpendicularly installed on the first member 13 and that are parallel to one another. An end portion of the second member 14 is connected to an end portion of the first member 13 or to a mid-portion of the first member 13.

The stringer 52 is entirely housed inside the frame member 5 in a lengthwise direction. That is, the frame member 5 is formed such that, when a plurality of stringers 52 are housed inside the transport jig 2, the frame member 5 is made an outermost peripheral part of the transport jig 2. Therefore, even when a plurality of transport jigs 2 are arranged next to one another in a factory or the like, the plurality of transport jigs 2 may be disposed adjacent to one another without being interfered with by contents such as the stringers 52. Accordingly, the transport jigs 2 and contents such as the stringers 52 may be stored in a predetermined place in an orderly manner.

The support section 6 supports a plurality of stringers 52 in parallel with one another in one direction. For example, the support section 6 includes base sections 15 that are installed on the second members 14, and clamps (not shown) that are installed on the base sections 15 and that hold the stringers 52.

A plurality of stringers 52 are installed in parallel with one another on the base section 15. The number of base sections 15 to be installed is determined based on the number of stringers 52 to be housed in the transport jig 2.

The clamp is fixed to the base section 15, and holds one stringer 52. The clamp is disposed at a position corresponding to an end portion or a mid-portion of the stringer 52 that is placed on the base section 15. The number of clamps to be installed on the transport jig 2 to hold one stringer 52 is determined according to a length, a shape and the like of the stringer 52. Accordingly, the number of second members 14 of the frame member 5 is also changed according to the number of clamps.

Figure 4:
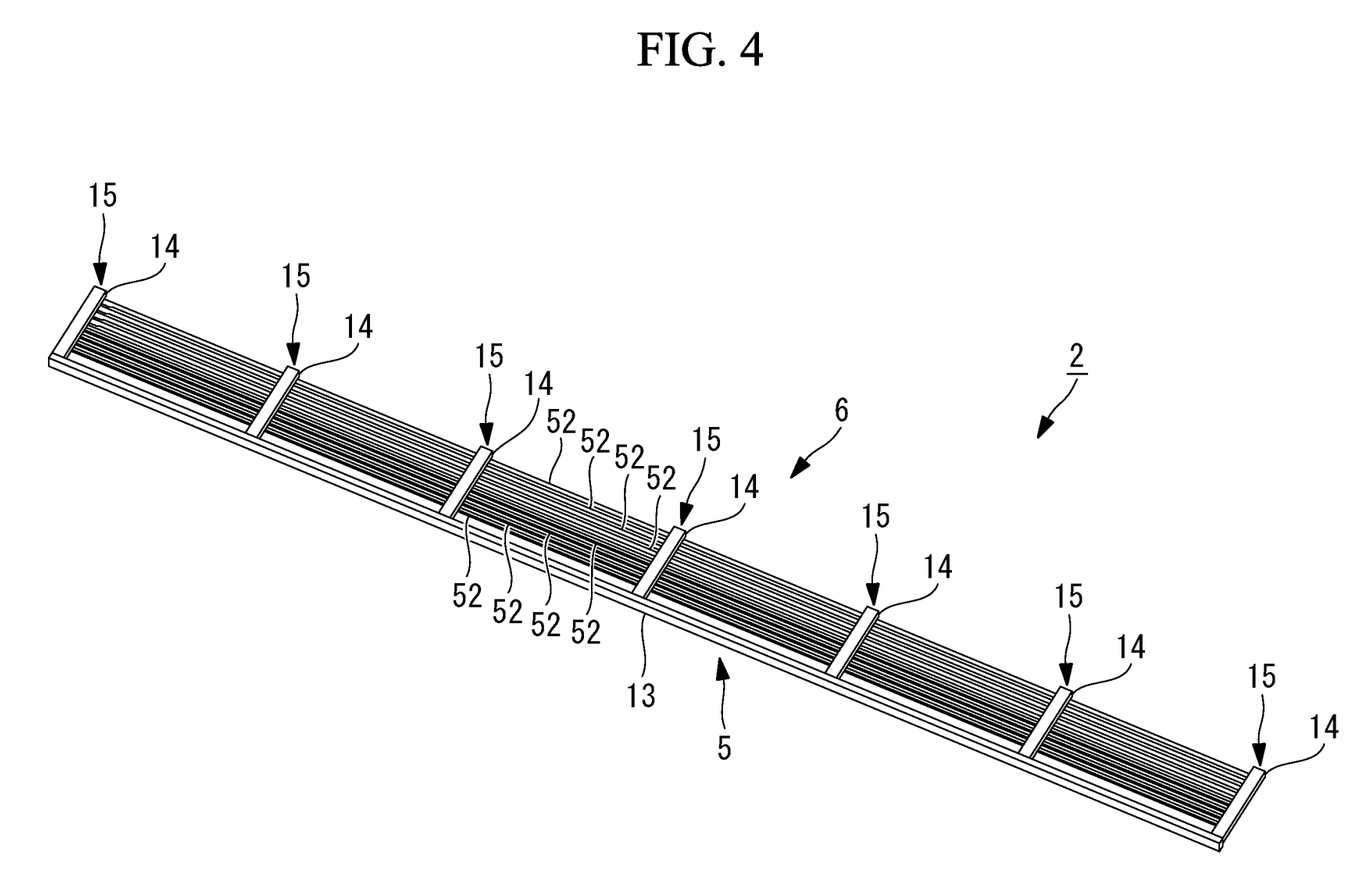
FIG. 4 is a perspective view showing a transport jig according to a second embodiment of the present invention, and shows a state where the transport jig is installed in a first direction.
Figure 5:
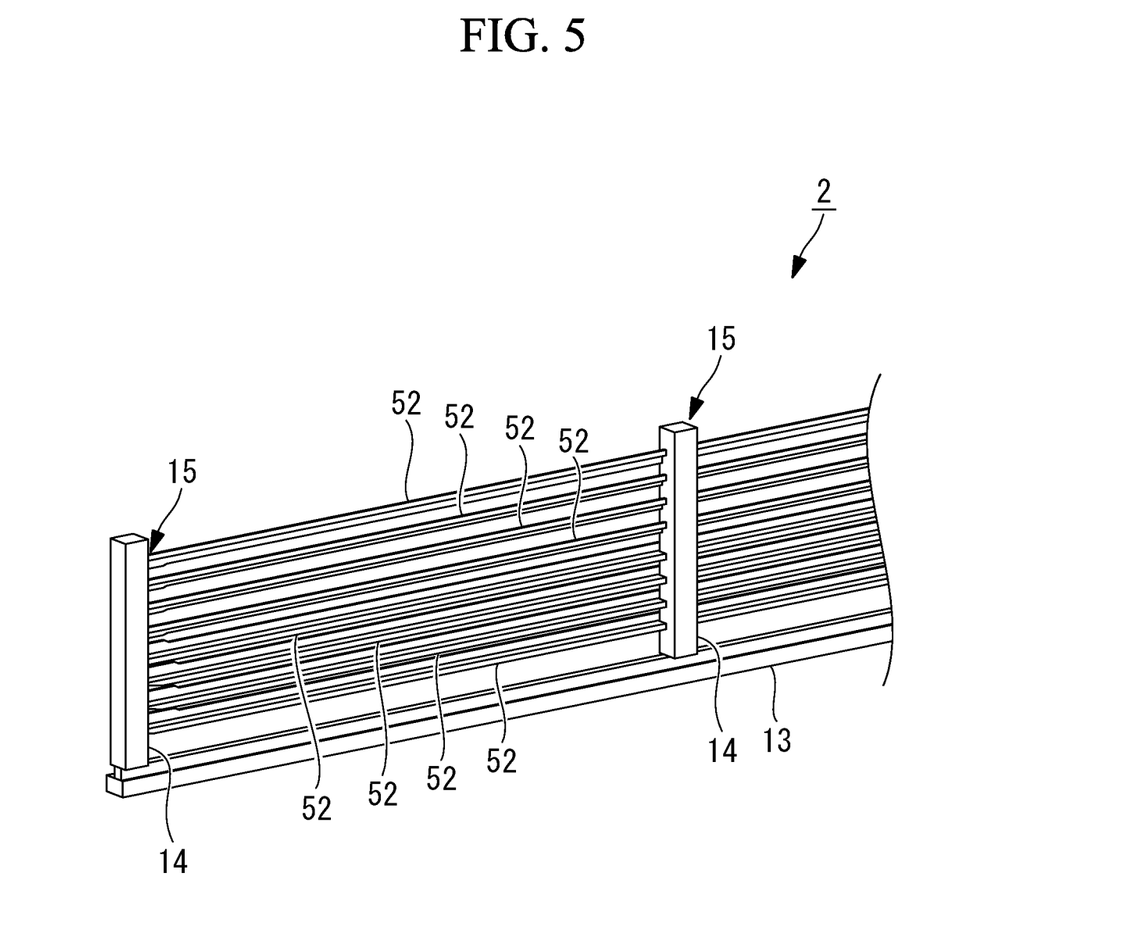
FIG. 5 is a perspective view showing the transport jig according to the second embodiment of the present invention, and shows a state where the transport jig is installed in a second direction.

The transport jig 2 may be formed in such a way that a sealant may be easily applied to the stringer 52 that is housed, as shown in FIG. 4, or in such a way that the stringer 52 may be easily removed from inside to outside the transport jig 2, as shown in FIG. 5, by changing an installation direction of the transport jig 2. Additionally, a case of applying a sealant to the stringer 52 is described below, but the present invention is not limited to such an example, and machining such as drilling may be performed on the elongated member such as the stringer 52 that is housed in the transport jig 2.

The transport jig 2 is moved from a storage place to a work place, or between different work places by being placed on a wheeled platform (not shown) or by two workers holding both end portions, for example. Additionally, wheels may be installed in advance on the frame member 5 of the transport jig 2 so as to enable the transport jig 2 to be moved on the wheels.

<First Direction>

As shown in FIG. 4, when the transport jig 2 is installed in a first direction, or in other words, when the transport jig 2 is installed with a quadrangular plane formed by the first member 13 and the second members 14 of the frame member 5 at a bottom, the base sections 15 are disposed with surfaces for supporting the stringers 52 facing upward. In the case where the stringers 52 are disposed on the base sections 15 in a state where the transport jig 2 is installed in the first direction, outer surfaces of the stringers 52 are positioned on an upper surface side of the transport jig 2.

The sealant is applied to the outer surface of the stringer 52 facing a skin, before a process of installing the stringer 52 on the skin. The skin and the stringer 52 adhere to each other by the sealant by application of the sealant to the stringer 52. In the case of installation in the first direction, the outer surface of the stringer 52, or in other words, an application surface, faces upward, and also, a plurality of stringers 52 are disposed inside the frame member 5, in parallel with one another in one direction. Accordingly, a worker or a work robot may access the plurality of stringers 52 from the one direction, from outside the frame member 5. Accordingly, when the sealant is applied to same surfaces of the stringers 52, an access direction does not have to be changed for each stringer 52, and work efficiency is high.

<Second Direction>

As shown in FIG. 5, when the transport jig 2 is installed with only the one first member 13, of the frame member 5, at the bottom, an axis direction of the base section 15 extends along the vertical direction. In the case where the transport jig 2 is installed in the second direction, and the stringers 52 are disposed across the base sections 15, the outer surfaces of the stringers 52 are positioned on a side surface side of the transport jig 2.

In the process of installing the stringer 52 on the skin, the stringer 52 is desirably transported with the surface on which the sealant is applied parallel to a surface of the skin, or in other words, with a sealant applied surface being substantially vertical. When the transport jig 2 is installed in the second direction, the sealant applied surface of the stringer 52 becomes vertical, and also, a plurality of stringers 52 are disposed in parallel with one another in one direction inside the frame member 5. Accordingly, at the time of removing the stringer 52 from the transport jig 2 and transporting the stringer 52 to a place at which the stringer 52 is to be installed on the skin, the worker or the work robot may transport the stringer 52 while hardly changing an orientation of the stringer 52.

Figure 6:
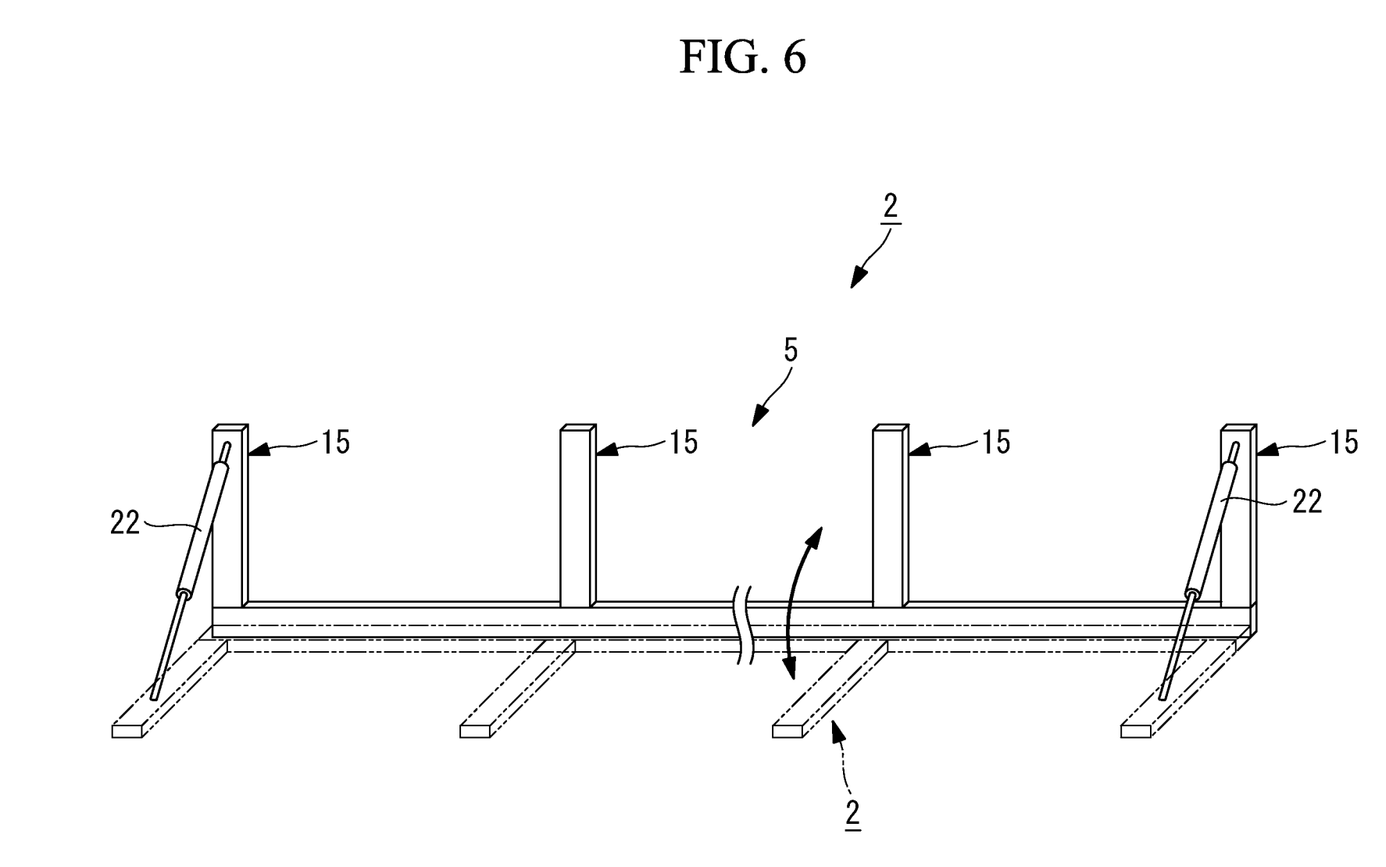
FIG. 6 is a perspective view showing the transport jig according to the second embodiment of the present invention, and solid line parts show a state where the transport jig is installed in the second direction, and dashed-double dotted line parts show a state where the transport jig is installed in the first direction.

The transport jig 2 is changed between the first direction and the second direction by a lifting device such as a chain block. Additionally, for example, as shown in FIG. 6, jacks 22 may be installed on the frame member 5 of the transport jig 2, and the transport jig 2 may be changed between the first direction and the second direction by driving the jacks 22. In FIG. 6, the transport jig 2 shown by solid lines is installed in the second direction, and the transport jig 2 shown by dashed-double dotted lines is installed in the first direction. Additionally, the stringers 52 and the like are omitted in FIG. 6. The transport jig 2 may be formed such that the jacks 22 are attached to the frame member 5 when the direction is to be changed, or may be formed such that the jacks 22 are permanently installed on the frame member 5, even when the direction is not to be changed.

REFERENCE SIGNS LIST 1 transport jig
2 transport jig
3 frame member
4 support section
5 frame member
6 support section
7 first member
8 second member
9 third member
10 diagonal member
11 first base section
12 second base section
13 first member
14 second member
15 base section
21 jack
22 jack
51 frame
52 stringer

The invention claimed is:

1. A transport jig comprising:
a frame member; and
a support section that is installed on the frame member, and that supports a plurality of elongated members, wherein
the elongated members are each entirely housed inside the frame member in a lengthwise direction,
the support section supports all the elongated members in parallel with one another in a first orthogonal direction perpendicular to a longitudinal direction of the frame member, and supports all the elongated members such that a stack of the elongated members in a second orthogonal direction perpendicular to the longitudinal direction and the first orthogonal direction consists of a single layer, and
the frame member is configured to change an installation direction thereof with respect to a horizontal plane so as to have a plurality of different installation directions.

2. The transport jig according to claim 1, wherein the support section is formed according to a shape of the elongated members to be housed, and is attachable/detachable with respect to the frame member.

3. The transport jig according to claim 1, wherein the frame member is placed in:
a state where the frame member is installed in a first direction allowing surfaces of the elongated members on which a sealant is to be applied or on which machining is to be performed to face upward,
a state where the frame member is installed in a second direction different from the first direction, the second direction allowing the elongated members housed in the frame member to be removed to outside the frame member, and
the first direction and the second direction are changed by changing an orientation of the frame member.

4. The transport jig according to claim 3, wherein a jack provided at the frame member is configured to be driven to change between the first direction and the second direction.

5. The transport jig according to claim 1, further comprising a wheel that is installed on the frame member.

6. The transport jig according to claim 1, wherein the support section supports the elongated members regardless of a direction among the plurality of different installation directions in which the frame member is installed.

7. A transport jig comprising:
a frame member; and
a support section that is installed on the frame member, and that supports a plurality of elongated members, wherein
the elongated members are each entirely housed inside the frame member in a lengthwise direction,
the support section supports the plurality of elongated members in parallel with one another in one direction,
the frame member is configured to change an installation direction thereof with respect to a horizontal plane so as to have a plurality of different installation directions,
the support section has an arc shape so as to place the elongated members having an arc shape on the support section,
the support section is disposed protruding upward in a direction vertical to the horizontal plane in a state where the frame member is installed in the first direction, and
the support section is disposed protruding upward in a direction parallel to the horizontal plane in a state where the frame member is installed in the second direction.

* * * * *